No. 659,275. Patented Oct. 9, 1900.
D. WILLIAMSON.
FRICTION CLUTCH.
(Application filed Jan. 24, 1900.)

(No Model.) 2 Sheets—Sheet 1.

WITNESSES:
Geo. B Rowley.
C. E. Ackerly

INVENTOR
David Williamson
BY
Rosenbaum
ATTORNEY

THE NORRIS PETERS CO., PHOTO-LITHO., WASHINGTON, D. C.

No. 659,275. Patented Oct. 9, 1900.
D. WILLIAMSON.
FRICTION CLUTCH.
(Application filed Jan. 24, 1900.)
(No Model.) 2 Sheets—Sheet 2.

WITNESSES:
Geo. B. Rowley.
C. E. Ackerly

INVENTOR
David Williamson
BY
Rosenbaum
ATTORNEY

THE NORRIS PETERS CO., PHOTO-LITHO., WASHINGTON, D. C.

UNITED STATES PATENT OFFICE.

DAVID WILLIAMSON, OF NEW YORK, N. Y., ASSIGNOR OF ONE-HALF TO
C. K. COOPER, SR., OF SAME PLACE.

FRICTION-CLUTCH.

SPECIFICATION forming part of Letters Patent No. 659,275, dated October 9, 1900.

Application filed January 24, 1900. Serial No. 2,630. (No model.)

*To all whom it may concern:*

Be it known that I, DAVID WILLIAMSON, a citizen of the United States, residing at the city of New York, borough of Manhattan, State of New York, have invented certain new and useful Improvements in Friction-Clutches, of which the following is a full, clear, and exact description.

This invention relates to friction-clutches of that general class in which friction-shoes located inside of a chambered pulley and operated by toggles or levers from a sliding sleeve are used.

One object of the invention is to provide a construction in which centrifugal force is taken advantage of when the clutch is in action to aid in maintaining the frictional surfaces in contact with each other and in which the centrifugal force will not act disadvantageously when the clutch is out of action by tending to move the various working parts of the clutch into contact with each other, and so create unnecessary friction when the parts are supposed to be running free.

A further object of my invention is to provide for the ready adjustment of the shoes to compensate for wear and in general to simplify the construction throughout.

With these objects in view my invention consists in so locating the toggles and levers with respect to each other and to the working parts of the clutch that the above-stated advantages of centrifugal force are obtained and the disadvantages thereof avoided.

The invention also consists of details of construction, which will be fully described and pointed out hereinafter.

Figure 1:
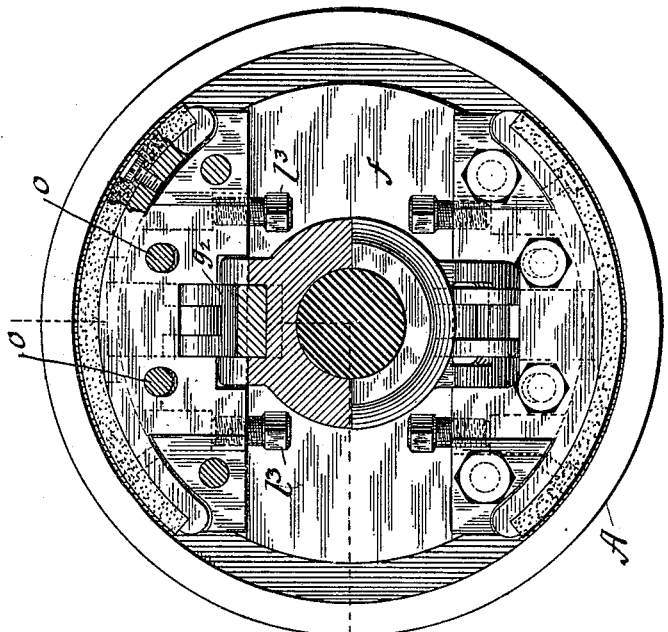
Figure 2:
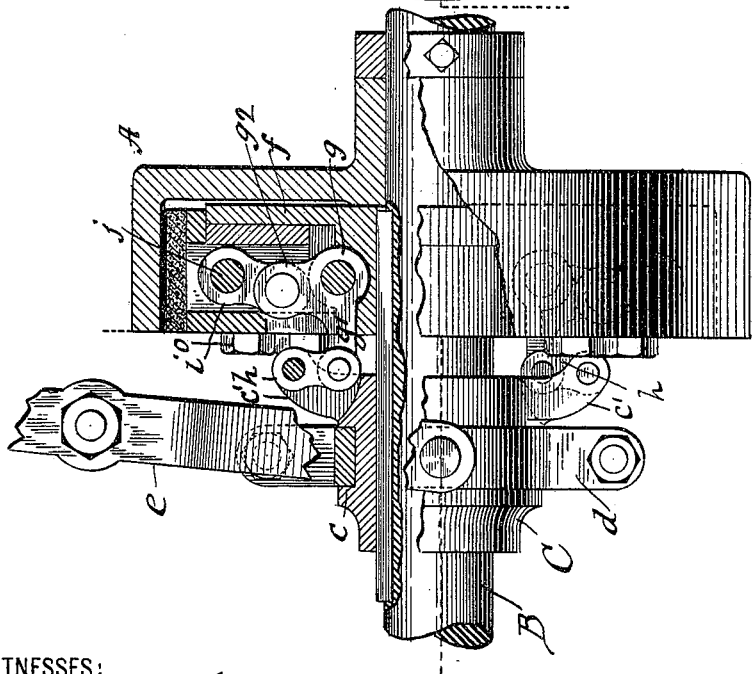
Figure 5:
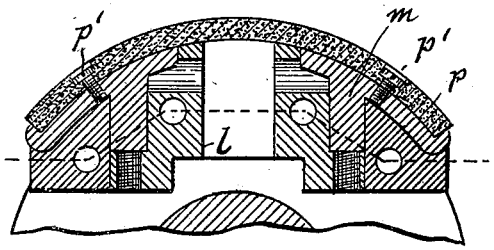
Figure 6:
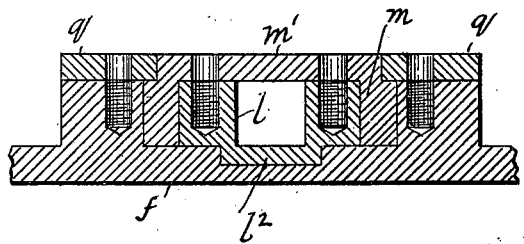
Figure 8:
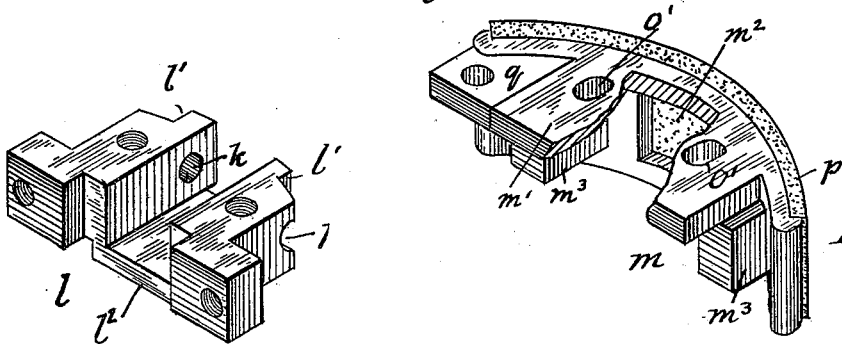
Figure 7:
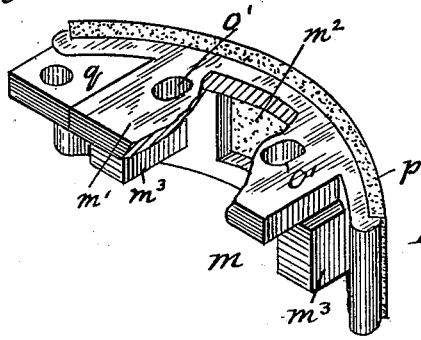
Figure 4:
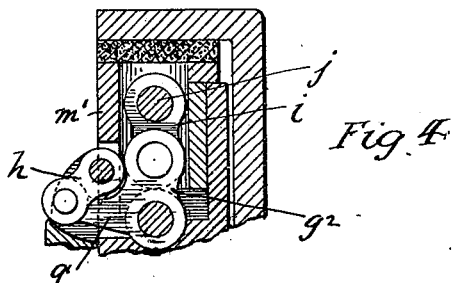
Figure 3:
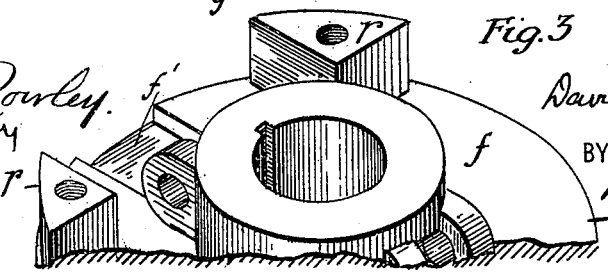

In the accompanying drawings, Figure 1 is an end view of the clutch with the shaft in section. Fig. 2 is a side elevation with parts broken away and in section. Fig. 3 is a detail of the carrying-plate. Fig. 4 is a partial section of the pulley-carrying plate and shoe with the connecting-toggle. Figs. 5 and 6 are sectional views of the shoe, and Figs. 7 and 8 are perspective views of parts of the shoe.

A represents a pulley loose on the shaft B.

C is the operating-sleeve splined to shaft B and provided with the usual annular groove $c$, containing the yoke $d$. The yoke, as usual, is connected with a controlling-lever $e$, by which the clutch is thrown in and out. The pulley A is provided with a chamber containing a driving-plate $f$, keyed to the shaft, in which, at diametrically-opposite points, are pivoted two bell-cranks $g$, one arm of which extends toward the sleeve C and the other arm at an angle toward the rim of the pulley. The two arms of the bell-crank are indicated by $g'$ and $g^2$. Arm $g'$ is connected with sleeve C by a link $h$, which is pivoted to the arm and between a pair of ears $c'$, carried by the sleeve. When the clutch is open, the link $h$ stands in a radial position with respect to the shaft, and when it is closed that end of the link engaging with the ears $c'$ is inclined toward the pulley, as shown in Fig. 4. Arm $g^2$ of the bell-crank is pivoted to a link or lever $i$, which is also pivoted to a cross-bolt $j$, supported in the shoe of the clutch. The arm $g^2$ of the bell-crank and the lever $i$ constitute a toggle by which great leverage may be obtained when forcing the frictional surfaces of the clutch into engagement. When the clutch-surfaces are engaged, the parts of the toggle are in a substantially-straight radial position with respect to the shaft, and when the clutch is disengaged the parts of the toggle are slightly inclined in a lateral direction, as indicated in Fig. 2.

The shoes, which are moved into frictional contact with the rim of the pulley, are of peculiar construction. Figs. 7 and 8 show two principal parts of the shoe. The part shown in Fig. 7 carries the cross-bolt $j$, it being seated in the opening $k\,k$. This block, (shown in Fig. 7,) which is indicated by $l$, fits into the central portion of the part $m$, underneath the cover-plate $m'$, which is a part of the piece $m$. When the part $l$ is adjusted to the part $m$, its forward end passes into an opening $m^2$, in which it fits, the shoulders $l'$ abutting against the sides of said opening to create an engagement between the two parts. The part $l$ also carries a bottom projection $l^2$, fitting into a groove $f'$ in the carrying-plate. The shoe $m$ is adjustable in a radial direction with respect to the block $l$ by means of bolts $o$, which pass through slots $o'$ in the part $m$. By slacking these bolts the part $m$ may be moved with respect to the block $l$ and then held in the new position by setting up the bolts until their heads clamp down upon the plate $m'$. This adjustment is usually made to compensate for wear of the lagging, which is shown at $p$, and consequently the part $m$ is usually forced toward the rim of the pulley, and for this purpose the block $l$ is provided with set-screws $l^3$, which impinge against the lugs $m^3$ on the part $m$. Hence by slacking the bolts $o$, then setting up the set-screws $l^3$, and finally tightening the bolts $o$ the adjustment is perfected. The shoe is held in place to prevent rattling and displacement by the corner-plates $q$ $q$, which are secured to lugs $r$ on the carrying-plate by bolts, as shown. The lagging $p$ is held upon the face of the shoe preferably by the screws $p'$; but any other method may be utilized.

The operation is as follows: When the clutch is to be closed, so that the shaft and pulley will rotate together, sleeve C is moved toward the pulley. This throws the toggles into the position shown in Fig. 4, where it will be seen that they occupy a radial position with respect to the shaft and that centrifugal force, acting upon them or upon the parts to which they are attached, tends to increase the grip between the frictional surfaces of the clutch. It will also be seen that centrifugal force, acting upon the link $h$ and the outer end of the bell-crank, will tend to tighten the clutch. When the clutch is opened, the link $h$ occupies a radial position with respect to the shaft, so that centrifugal force would not create a tendency to move the sleeve C, and so create friction between the sleeve and the yoke $d$, which is held by the operating-lever $e$. In many forms of clutches heretofore produced this friction takes place and is the means of consuming a great deal of power.

Having described my invention, I claim—

1. In a friction-clutch, the combination of a rotary shaft, a sleeve adapted to slide axlewise, a rotary member mounted concentrically with the shaft, a friction-shoe adapted to engage said rotary member, a system of levers connecting the sleeve and shoe together and means whereby that terminal member of said system which is connected with the sleeve, will occupy a radial position with respect to the shaft when the clutch is open, substantially as described.

2. In a friction-clutch, the combination of a carrying-plate, a shoe, a bell-crank, a toggle one member of which is one arm of the bell-crank, a link connected with the other arm of the bell-crank, a sleeve connected with the link, the link being in a radial position with respect to the shaft, when the clutch is open, substantially as described.

3. In a friction-clutch, the combination of a carrying-plate, a shoe, two levers pivoted together and one pivoted to the shoe and the other to the carrying-plate said levers occupying a radial position with respect to the shaft when the clutch is closed one of said levers constituting one arm of a bell-crank the other arm of which extends lengthwise of the shaft, a link connected with said other arm and occupying a position radial to the shaft when the clutch is open and a shifting sleeve with which the link is connected.

In witness whereof I subscribe my signature in presence of two witnesses.

DAVID WILLIAMSON.

Witnesses:
FRANK S. OBER,
WM. A. ROSENBAUM.